United States Patent [19]

Hunt

[11] 4,451,514
[45] May 29, 1984

[54] AUTOMOTIVE HEAT REFLECTOR SHIELD

[76] Inventor: Brion L. Hunt, One Drayton St., Savannah, Ga. 31401

[21] Appl. No.: 334,223

[22] Filed: Dec. 24, 1981

[51] Int. Cl.³ .............................................. B60J 7/08
[52] U.S. Cl. ...................................... 428/71; 296/211; 428/81; 428/192; 428/316.6
[58] Field of Search .................. 428/31, 316.6, 71, 81, 428/192; 296/136, 211–214, 218

[56] References Cited

U.S. PATENT DOCUMENTS

| | | | |
|---|---|---|---|
| 2,874,709 | 2/1959 | Cohen et al. | 296/136 X |
| 3,160,549 | 12/1964 | Caldwell et al. | 428/316.6 X |
| 3,620,906 | 11/1971 | Hannes | 428/339 |
| 3,697,126 | 10/1972 | Tiffin et al. | 296/214 |
| 3,814,659 | 6/1974 | Nadeau | 428/316.6 X |
| 3,867,240 | 2/1975 | Doerfling | 428/316.6 X |
| 3,949,137 | 4/1976 | Akrongold et al. | 428/15 X |
| 3,954,537 | 5/1976 | Alfter et al. | 428/316.6 X |
| 3,992,053 | 11/1976 | Hrytzak et al. | 296/136 |
| 4,020,207 | 4/1977 | Alfter et al. | 428/138 |
| 4,120,529 | 10/1978 | Chrysler | 296/218 |
| 4,150,850 | 4/1979 | Doerfling | 428/137 X |
| 4,172,918 | 10/1979 | Doerer | 428/174 |
| 4,188,440 | 2/1980 | Doerer | 428/316.6 X |
| 4,209,197 | 6/1980 | Fischer | 296/136 X |
| 4,263,356 | 4/1981 | Nomura et al. | 428/316.6 X |
| 4,290,640 | 9/1981 | Dalton | 296/95 R |
| 4,330,150 | 5/1982 | Dunchock et al. | 296/218 |

Primary Examiner—Henry F. Epstein
Attorney, Agent, or Firm—Jim Zegeer

[57] ABSTRACT

A novel automotive heat reflector shield comprising aesthetic-appearing, laminated, energy saving device for excluding sunrays, having a minimum angle of incidence of 45°, from penetrating automobile roofs equipped with sunroof and T-top roof configurations. The shield is insulative and thermally, acoustically nonconductive and thermal and light reflective. The shield is affixed by attachment means to interior of automobile equipped with sunroof or T-top roof inferior to said sunroof or T-top roof. Comprising a shield for providing automobiles, whether parked or during operation with passive cooling device thermally maintaining cooler interior so as to diminish air-conditioning requirements thereby reducing fuel consumption. It also excludes road noise and serves as a safety device capable of shielding occupants of automobile equipped with sunroof or T-top roof from being ejected through said sunroof or T-top roof during collision with other automobile or object.

5 Claims, 8 Drawing Figures

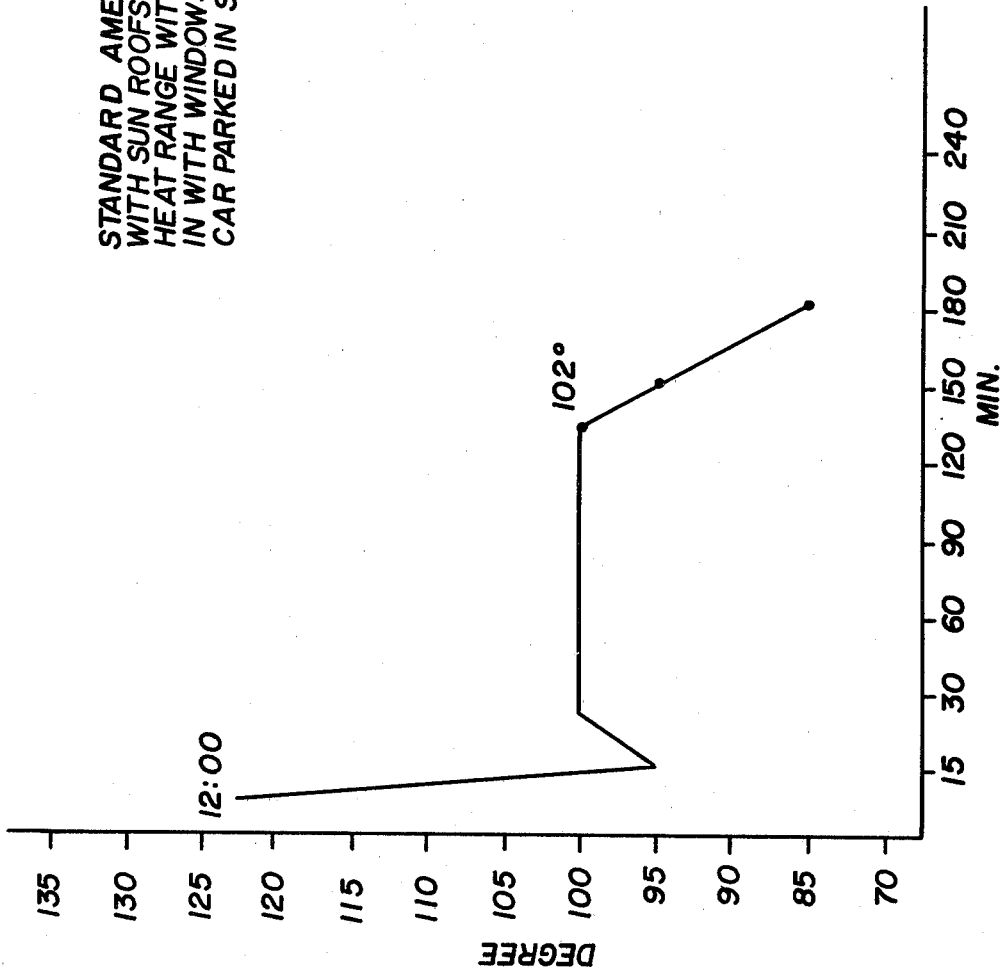

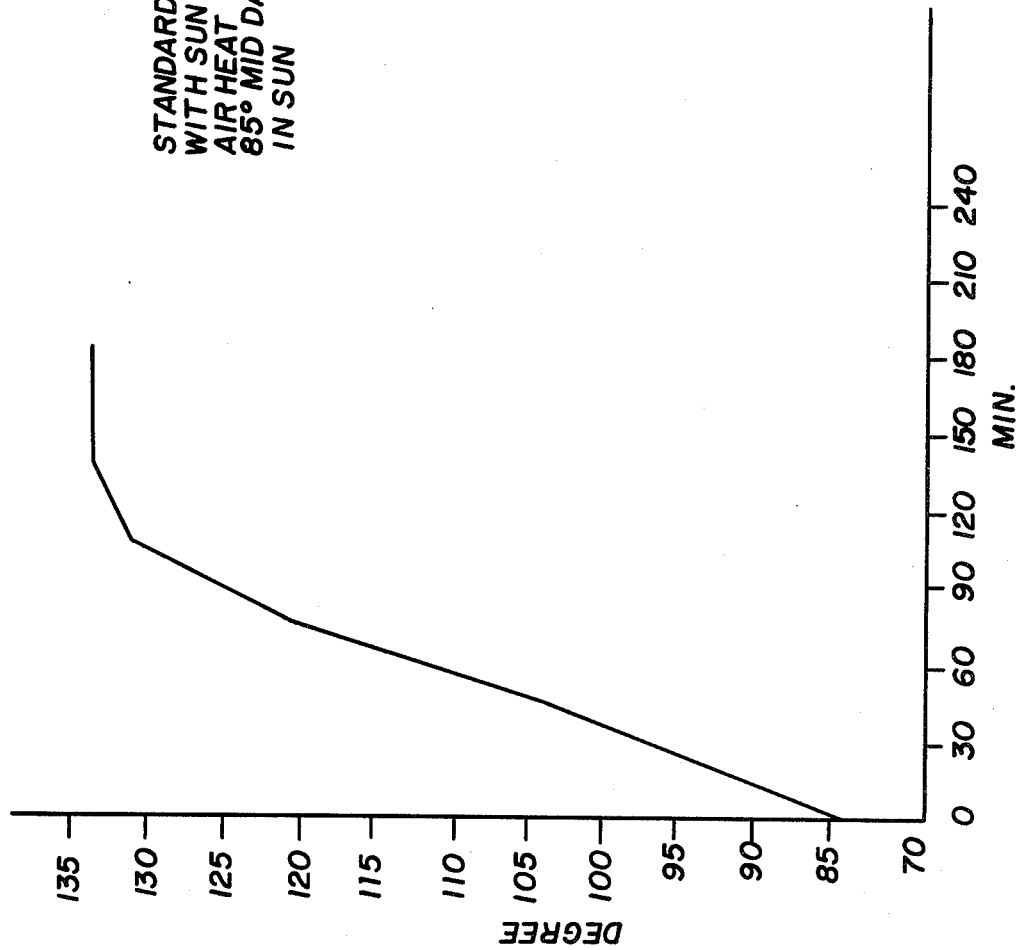

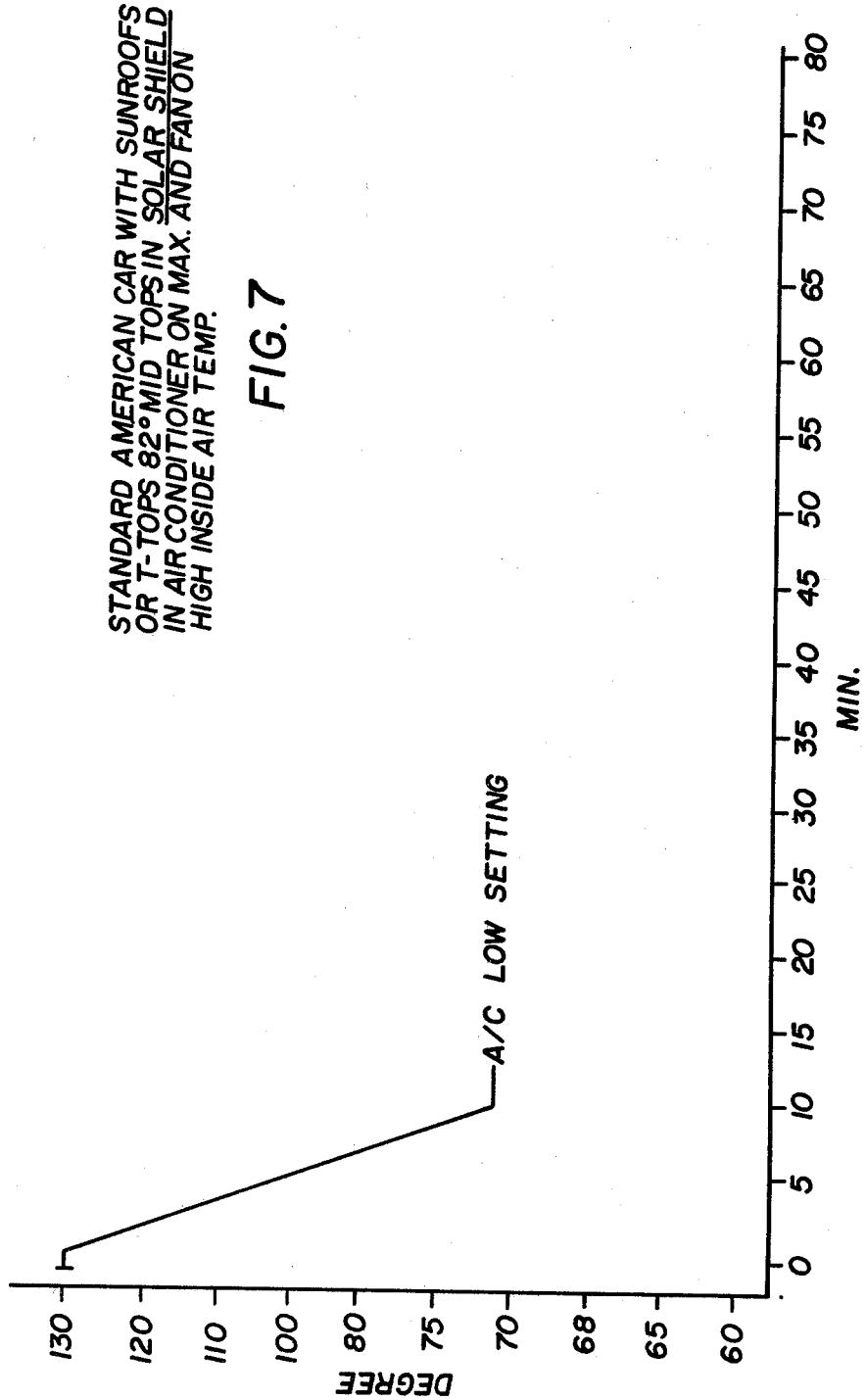

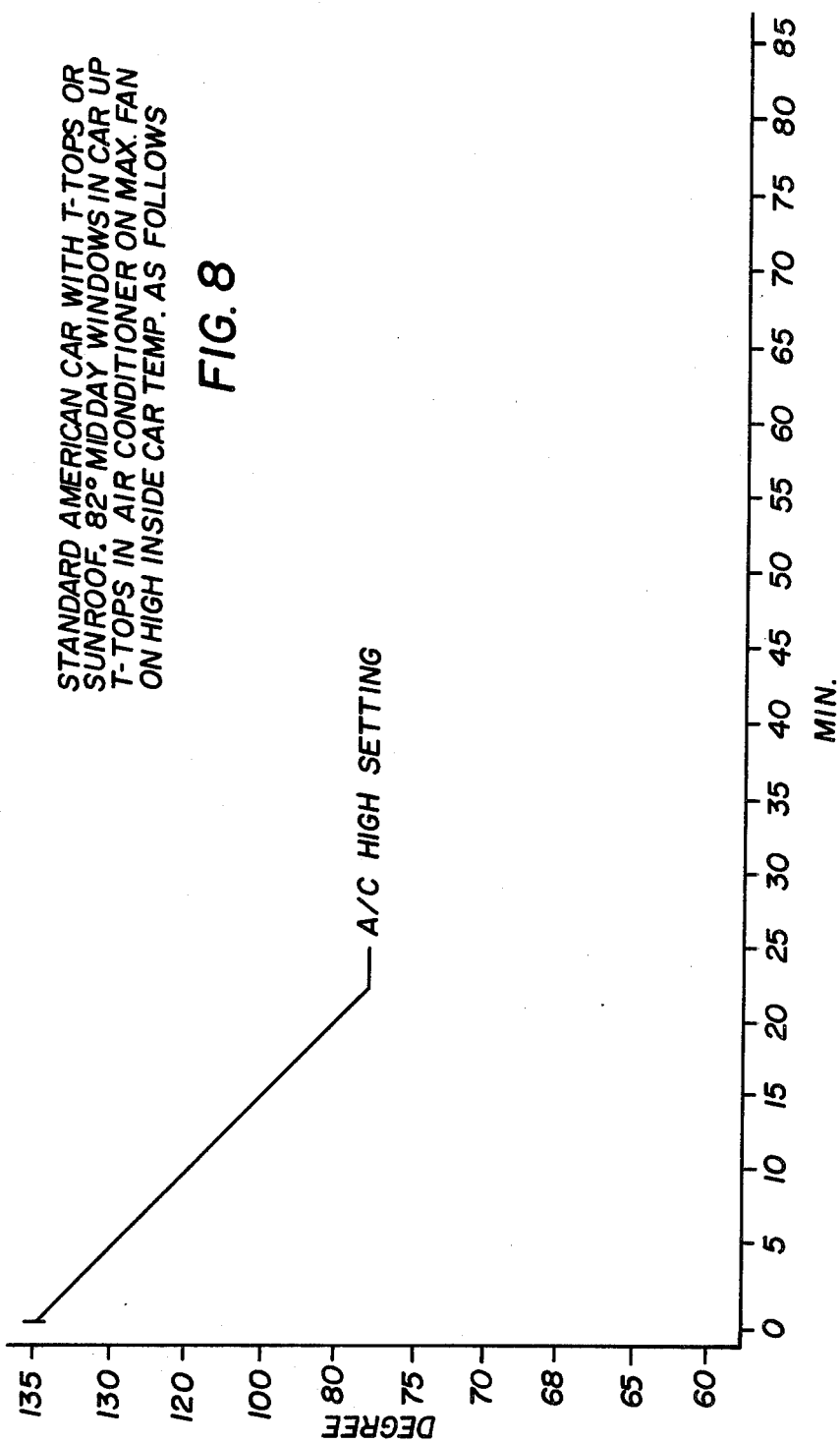

AUTOMOTIVE HEAT REFLECTOR SHIELD

SUMMARY OF THE INVENTION

The invention relates to a novel method of providing increased insulation to automobiles equipped with sunroofs and T-top roofs. A highly non-conductive panel comprising layers consisting of foam type material, and highly reflective polished aluminum compound. Due to its high rate of non-conductivity, provides insulation and reflection. The object is to minimize automobile cooling requirements and to provide a comfort zone thus effecting fuel savings and cost savings, as well as provide a more pleasant environment thermally, acoustically and because of its high impact strength a shield that will prevent ejection through the sunroof in the event of collision. The shield may be installed or removed at the option of the operator in less than thirty seconds.

SPECIFICATIONS AND DETAILED DESCRIPTION OF THE INVENTION

FIGS. 5, 6, 7, and 8 are graphs 1, 2, 3 and 4, respectively, which show the advantages and results of tests conducted with and without the shield of this invention.

Figure 1:
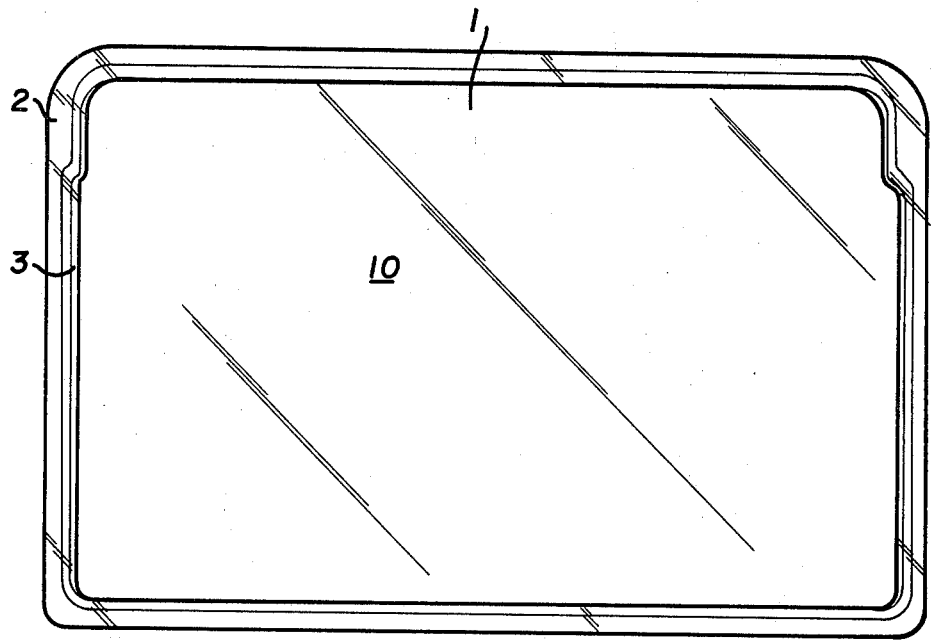
FIG. 1 is a top elevational view of an embodiment of the present invention.
Figure 2:
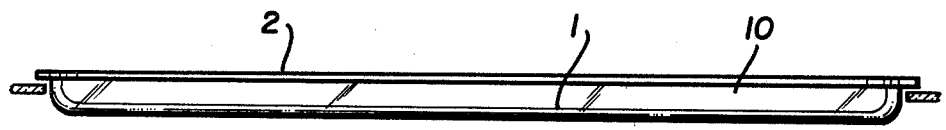
FIG. 2 is a side elevational view of the embodiment of FIG. 1.
Figure 3:
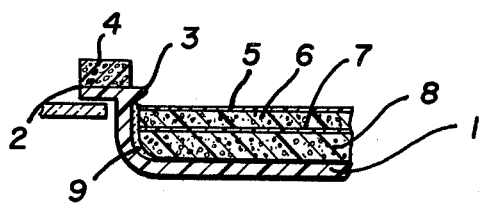
FIG. 3 is a sectional view of the embodiment in FIG. 2.
Figure 4:
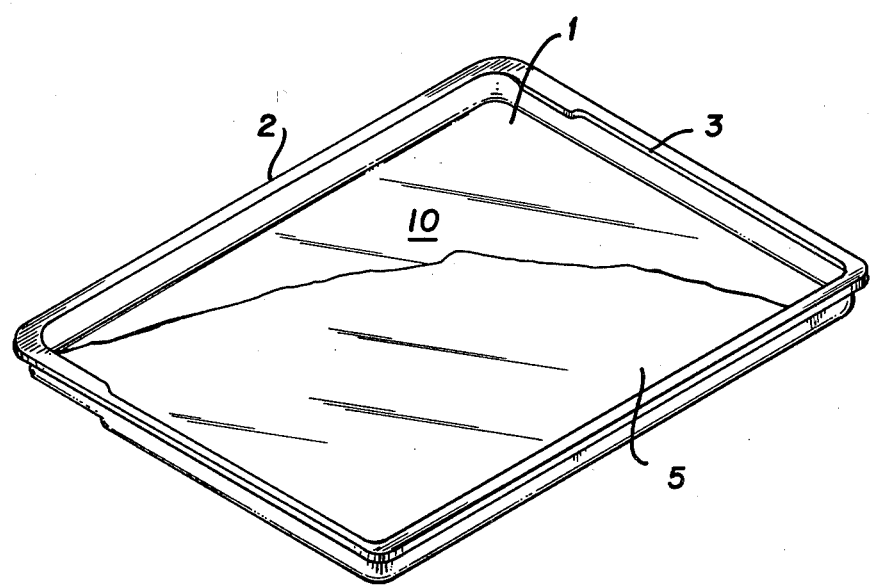
FIG. 4 is a three-dimensional perspective of the invention.

The shield (FIG. 4) is a three-dimensional rectangular panel comprising such dimensions as will readily fit current automobiles on the market equipped with sunroof and T-top roof. For the sake of convenience the word sunroof will be used to denote either type fixture. FIG. 1 is a top view illustrating reflective layer 5; FIG. 3 is a cross-section illustrating laminated layers and attachment means 2, 4; FIG. 2 is a side view illustrating textured acoustic and high impact strength material.

The shield comprises a shell consisting of a stiff and high impact strength acrylonitrile-butadiene-styrene 1 which provides the outer covering, which can be color accented and have various interior decorating designs to conform to the occupant's aesthetic values. This shell has a depression 10 and attachment means 2,4, whereby it can be temporarily supported on the edge sections of the existing rim of the transparent sunroof or T-top roof, and attachment means 2,4, being located between the two. Attachment means 2 has superimposed seal 4, and is consequently an integral part of the attachment means. The panel has a shallow, flat depression 10 which contains a layer of flexible foam latex 6; a layer of a vinyl material 7; another layer of foam latex 8; a highly reflective aluminum layer composition on the superior sun-exposed surface 5; pressure sensitive adhesive on the inferior surface 9; a retention lip 3; and seal 4 consisting of latex. Plastic foam may also be utilized.

For the past few years there has been a noted increase in popularity by the general public in the utilization of automobiles equipped with sunroofs of the fixed or removable type or flip-up type and those equipped with a longitudinally aligned roll bar, commonly designated "T-tops", which are either fixed or removable. Its popularity is largely due to a degree of dissatisfaction of a segment of automobile operators with pure convertible type tops. The sunroof allows the operator to enjoy the best of both worlds simultaneously, i.e. a rigid and leak-proof roof designed for exposure to the elements of nature thus providing its occupants a degree of pantheistic encounter during its utilization. Nevertheless there are negative components to be considered. They are as follows: The angle of incidence of sunrays during summer months especially in the lower latitudes of this country are almost vertical. The angle of incidence is in excess of 45° during the sun's transversal of apex and during seven hours of the eight workday (depending on location), which rays readily penetrate sunroofs, thereby generating an enormous amount of heat inside of the automobile. This was observed especially by the inventor in parked and locked automobiles. Most of these automobiles are not parked in shady areas; they are directly exposed to the sun and thus readily absorb the sun's thermal energy as encompassed by those rays penetrating the sunroofs. Because of the excessive heat buildup, it takes substantially increased cooling effort to lower the interior ambient temperture of said automobiles. This is readily observable by test results annexed hereto. See Graph 2, indicating temperature curves for automobiles equipped with sunroofs without the shield installed; Graph 1 indicating temperature curves for automobiles with sunroofs with heat shield installed; Graph 3, indicating corresponding time-lapse/cooling curves with air-conditioning operating, with shield installed; Graph 4, indicating time-lapse/cooling curves with air-conditioning operating, without shield installed. Inspection of these graphs, obtained by experimental means, readily indicate the different temperature values obtained. These curves translate instantly into fuel saving availability as diminished cooling requirements will demand less air-conditioner operation which is dependent on and is a function of drive shaft take-off power. It is estimated that generally automotive air-conditioning units require approximately 3 horsepower during hot days, as compressors build pressures up to 325 lbs/in$^2$. These values will provide tangible savings and there will exist a more subjectively agreeable comfort zone to be enjoyed by the occupants. Its utilization is not solely limited to parked automobiles, but can be utilized during operation of automobiles at the option of the operator, thereby also providing significant impact on reducing fuel consumption.

The material utilized in the construction of the panel is of such thickness dimension that the rigidity or stiffness factor equals that of steel utilized in automobile roof construction. Calculating equivalent rigidity is simply determined by utilizing the formula $$T_1 = \frac{\sqrt[3]{E_2(T_2)^3}}{E_1}$$

where $E_1$ is flexular modulus of unknown material; $E_2$ is flexular modulus of steel; $T_1$ is unknown thickness of panel material; $T_2$ is thickness of steel. The result is that a thickness can be utilized that is equivalent to pressed steel having a thickness of 0.025 inch commonly utilized in automobile roofs. This coupled with the high impact strength of the material, a plastic compound, provides unique additional safety criteria to the automobile equipped with sunroof when the shield is affixed inferior thereto. Thus during a collision, when such forces are present that will propel an occupant's head upward and into the sunroof glass, will instead strike the inferior side of the shield which will because of its high impact strength, not shatter but will absorb the blow.

In addition to heat reflection, insulation qualities of the invention, there exist noise abating qualities. Outside noises readily penetrate glass or other translucent materials. The layers of materials utilized by the invention provide substantial noise reduction inside the automobile as more fully described in Graph 5 indicating its noise absorbent and acoustic qualities. Consequently occupants enjoy a less noisy interior environment, if they elect to utilize the shield during operation of the automobile.

Unfortunately some sunroof and T-top devices permit the intrusion of precipitation causing the interior and occupants to become wet. The effect of seal 4 is also to exclude the intrusion of water thereby protecting the occupants and interior of automobile from being moistened.

The embodiment with minor adjustments and appropriate fairing and attachment means can be utilized as an insert and be functional as a headliner as well as side, door and floor panel of automobiles.

| RELEVANT PRIOR ART | | | | | |
|---|---|---|---|---|---|
| 3,867,240 | 2/75 | Doerfling | 4,172,918 | 10/79 | Doerer |
| 3,697,126 | 10/72 | Tiffin et al. | 4,150,850 | 4/79 | Doerfling |
| 3,620,906 | 11/71 | Hannes | 4,020,207 | 4/77 | Alfter et al. |
| 4,263,356 | 4/81 | Nomura et al. | | | |
| 4,290,640 | 9/81 | Dalton | | | |
| 4,188,440 | 2/80 | Doerer | | | |

What is claimed is:

1. An automotive heat reflector shield for excluding sun rays, having a minimum angle of incidence of 45°, from penetrating an automobile roof equipped with a transparent roof construction and having an interior rim therein, comprising in combination,
    a shell member made of a rigid, high impact strength plastic,
    a shallow flat depression on said shell member,
    means constituting a thermally and acoustically insulating layer carried within the boundaries of said shallow flat depression of said shell member,
    a thermal and light reflecting surface layer on the outer surface of said thermal and acoustic insulating layer, and
    attachment means for temporarily supporting said shell member on said interior rim and the interior surface of said automobile roof to cover said transparent roof construction, said attachment means including a peripheral extension of said shell member and intergal therewith.

2. The protective shield as defined in claim 1, wherein said shell is of sufficient thickness and strength to prevent ejection or serious injury to occupants through said transparent roof during any collision.

3. The protective shield for automobiles as defined in claim 1, wherein said shell has a retention lip peripherally surrounding said layers and a pressure sensitive adhesive on the interior of said shell for retaining said layers in said shell.

4. The protective shield for automobiles as defined in claim 1, wherein said thermally and acoustic insulating layer is constituted by a first flexible foam latex layer, a vinyl layer and a further latex foam layer, said vinyl layer being sandwiched between said two flexible foam latex layers.

5. The protective shield for automobiles as defined in claim 4, wherein said shell member in acrylonitrile butadiene styrene and is of such thickness dimension that the rigidity factor equals that of steel utilized in automobile roof construction having a thickness of approximately 0.025 inch.

* * * * *